(12) United States Patent
Sun

(10) Patent No.: US 6,295,311 B1
(45) Date of Patent: Sep. 25, 2001

(54) METHOD AND APPARATUS FOR COMPENSATING FOR PHASE DIFFERENCES IN RECEIVED SIGNALS

(75) Inventor: Feng-Wen Sun, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 08/966,253

(22) Filed: Nov. 7, 1997

(51) Int. Cl.$^7$ ........................................... H04K 1/00
(52) U.S. Cl. ............................. 375/147; 370/342
(58) Field of Search ................... 375/130, 147, 375/148, 262, 267, 347; 370/342, 335; 455/132, 133, 137

(56) References Cited

U.S. PATENT DOCUMENTS

| | | | |
|---|---|---|---|
| 5,237,586 | * 8/1993 | Bottomley | 370/342 |
| 5,305,349 | * 4/1994 | Dent | 370/342 |
| 5,754,599 | * 5/1998 | Ling et al. | 375/341 |
| 5,768,307 | * 6/1998 | Schramm et al. | 375/324 |
| 5,987,076 | * 11/1999 | Zehavi et al. | 370/335 |

* cited by examiner

Primary Examiner—Tesfaldet Bocure
(74) Attorney, Agent, or Firm—John T. Whelan; Michael W. Sales

(57) ABSTRACT

A method and apparatus for estimating the phase of noncoherently detected signals is provided. The received signals are in-phase and quadrature-phase signals from fingers of a rake receiver. A joint detection and estimation strategy is employed to increase the received signal-to-noise ratio of a code-division multiple access (CDMA) communication system. An orthogonally encoded signal is noncoherently detected and select signal components from the received signal are used in estimating the unknown phase and strength of the signal. Values are determined by a Fast Hadamard Transform indicative of a likelihoods that estimated signals correspond to the transmitted signal. Corresponding values are summed and the index of the largest sum is used to select likelihood values. A weight is developed by accumulating a plurality of the selected values over a predefined time period and calculating an average of the plurality, or a subset of the plurality. The likelihood values are then scaled, by multiplying them by the weight, and again combined by summing corresponding values.

28 Claims, 4 Drawing Sheets

METHOD AND APPARATUS FOR COMPENSATING FOR PHASE DIFFERENCES IN RECEIVED SIGNALS

TECHNICAL FIELD OF THE INVENTION

The present invention relates generally to radio communication systems, and more particularly to a method and apparatus for performing phase estimation of a noncoherently detected signal transmitted in a mobile communication system such as a code-division multiple access communication system.

BACKGROUND OF THE INVENTION

Spread spectrum is a digital radio frequency signaling technique in which a synchronized code is used by a transmitter and receiver pair to respectively spread and de-spread a transmitted data sequence over a predefined bandwidth. As the name suggests, spread spectrum systems utilize more bandwidth than other conventional signaling techniques such as time-division multiple access (TDMA). However, the improved security and noise rejection attained by spread spectrum systems compensates for the increased bandwidth requirements.

Spread spectrum modulation was originally developed for military use, where secure communications were required. However, due to its unique multipath and interference rejection characteristics, spread spectrum has civilian applications in mobile radio environments. Spread spectrum techniques are especially well suited for applications where a number of independent users need to share a common band of frequencies without the benefit of an external synchronizing mechanism, such as in code-division multiple access (CDMA) cellular radio systems.

CDMA techniques are well known. Some well known CDMA systems employ coherent detection for both directions of the communication path (i.e., base station to mobile and vice versa). Coherent detection (with phase) offers significant advantages over noncoherent detection (without phase). However, for the conventional phase locked loop type of phase synchronization, a stable signal with a high signal-to-noise ratio is required to track the unknown phase. For the reverse link (mobile unit to base station) of CDMA systems, several reasons make such phase tracking impractical. First, the spreaded signal has very low signal-to-noise ratio which cannot be used for tracking the phase of the signal. Second, fast fading makes the signal unstable and shifts the unknown phase. Thus, a very fast tracking loop is required to maintain a good estimation of the phase. In addition, the bursty nature of voice activity disrupts the signal. Further, excessive power consumption precludes transmitting a pilot signal from the mobile. Moreover, a rake receiver is typically used to combine multipath fading. If a plurality of multipath signals are used for the demodulation, the signal-to-noise ratio per path to achieve the desired performance will be significantly reduced. However, each path experiences independent phase shift. Thus, the phase tracking loop has to work with a very low signal-to-noise ratio for each path. Finally, any phase tracking circuitry built to overcome the above difficulties, will be complicated and expensive. Rake receivers comprise multiple data receivers, thus, the complexity of the circuitry required for phase tracking is dependant upon the number of demodulated paths which is typically relatively high.

Because of the difficulties associated with coherent detection, noncoherent detection is typically used in the reverse link of CDMA systems. In order to achieve decoding in many CDMA systems, both an orthogonal code and a convolutional code have to be soft-decision decoded. If orthogonal coding were the outer layer (first step in transmit and last step in receive), its soft decision decoding would be straightforward. However, in order to soft-decision decode the convolutional code, the decoder of the orthogonal code must develop a likelihood for each convolutional code symbol.

Prior art approaches to this issue have certain drawbacks. For instance, prior art approaches do not deliver the signal-to-noise ratios achievable if coherent detection could be used. What is needed therefore, is a method for estimating the unknown phase and strength of a noncoherently detected signal in order to increase the received signal-to-noise ratio of symbols transmitted in code-division multiple access communication systems and, thus, the capacity of such systems.

SUMMARY OF THE INVENTION

In accordance with a first aspect of the invention, a method for estimating the phase of a noncoherently detected orthogonal signal is provided. The method comprises the steps of: sampling first and second received signals, wherein each of the first and second received signals is representative of a transmitted signal; and respectively determining first, second, third and fourth values from the first, second, third, and fourth received signals wherein the first and second values and the third and fourth values are respectively indicative of a likelihood that first and second estimated signals correspond to the transmitted signal. The method also comprises the steps of developing an index from the first, second, third and fourth values; selecting a first selected value from the first and second values based on the index; developing a first weight from the first selected value; selecting a second selected value from the third and fourth values based on the index; developing a second weight from the second selected value; scaling the first and second values with the first weight; and, scaling the third and fourth values with the second weight.

In some preferred embodiments, the first received signal is an in-phase signal from a first finger of a rake receiver and the second received signal is a quadrature-phase signal. In other preferred embodiments, the first received signal is an in-phase signal from a first finger of a rake receiver and the second received signal is from a second finger of a rake receiver.

In any of the foregoing embodiments, the step of determining a first value may optionally be performed via a Hadamard Transform; the step of developing an index may comprise summing the first and third values and summing the second and fourth values and selecting the index of the larger of the two sums; and/or the step of scaling the first and second values comprises multiplying the first and second values by the first weight.

In some embodiments, the step of developing the weight comprises the step of accumulating a plurality of the selected values over a predefined time period and calculating an average of the plurality. In such an instance, the average may optionally be calculated based on a subset of the plurality.

In any of the foregoing embodiments, the method may also include the step of combining the scaled first value with the scaled third value and combining the scaled second value with the scaled fourth value.

In accordance with a further significant aspect of the invention, an apparatus for compensating for phase differences between first and second received signals corresponding to a transmitted signal is provided. The apparatus comprises a first selector for selecting a first value from first and second likelihoods that first and second estimates correspond to the transmitted signal. The first and second likelihoods are based on the first received signal. The apparatus also includes a first estimator for developing a first weight from the first value; and a second selector for selecting a second value from third and fourth likelihoods that third and fourth estimates correspond to the transmitted signal. The third and fourth likelihoods are based on the second received signal. In addition, the apparatus is provided with a second estimator for developing a second weight from the second value.

In some preferred embodiments, the apparatus is further provided with a first buffer for buffering the first value. In such embodiments, the apparatus may optionally be provided with a second buffer for buffering the second value; a first queue for queuing the first and second likelihoods; and/or a second queue for queuing the third and fourth likelihoods.

In some embodiments, the first received signal is an in-phase signal from a first finger of a rake receiver. In such an embodiment, the second received signal may be a quadrature-phase signal; and/or the second received signal may be from a second finger of a rake receiver.

In any of the foregoing embodiment, the apparatus can be additionally provided with means for developing likelihoods from a received signal. In the some embodiments, the developing means develops likelihoods in accordance with a Hadamard Transformer.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although the following description focuses on a method and apparatus for accurately estimating the phase of a noncoherently detected CDMA signal, persons of ordinary skill in the art will readily appreciate that the teachings of the present invention are in no way limited to CDMA systems. On the contrary, any communication system which might benefit from accurate phase estimation may employ the techniques shown herein. Such systems might include other coded communications techniques not traditionally referenced as CDMA. Persons of ordinary skill in the art will also appreciate that the techniques of the present invention are particularly well suited to messaging systems employing a transmitter and receiver pair, synchronized by a coded sequence, that can benefit from an increase in the signal-to-noise ratio.

Figure 1:
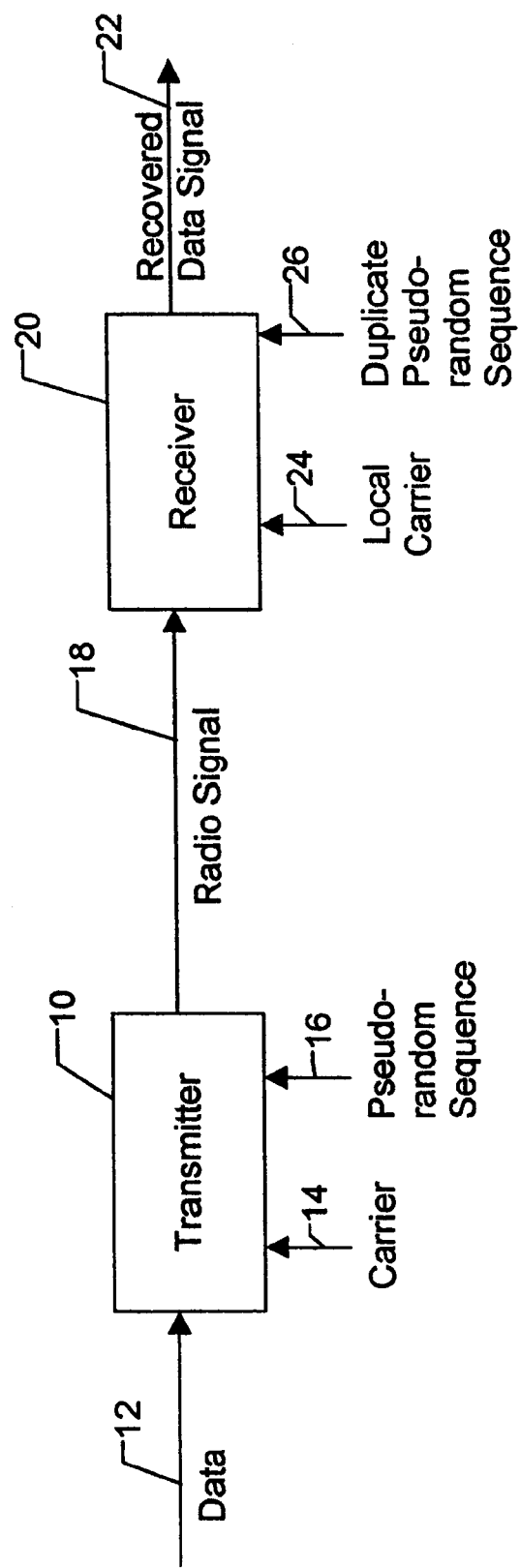
FIG. 1 is a block diagram of a typical code-division multiple access communication system capable of utilizing the present invention.

A typical code-division multiple access communication system is shown in FIG. 1. A transmitter 10 mixes a data signal 12, representing a message to be sent, with a carrier 14 and a pseudo-random code sequence 16 to produce a radio signal 18. The radio signal 18 is captured by a receiver 20 which recovers an estimate 22 of the data signal 12 by mixing the radio signal 18 with a local carrier 24 and a duplicate pseudo-random code sequence 26.

Figure 2:
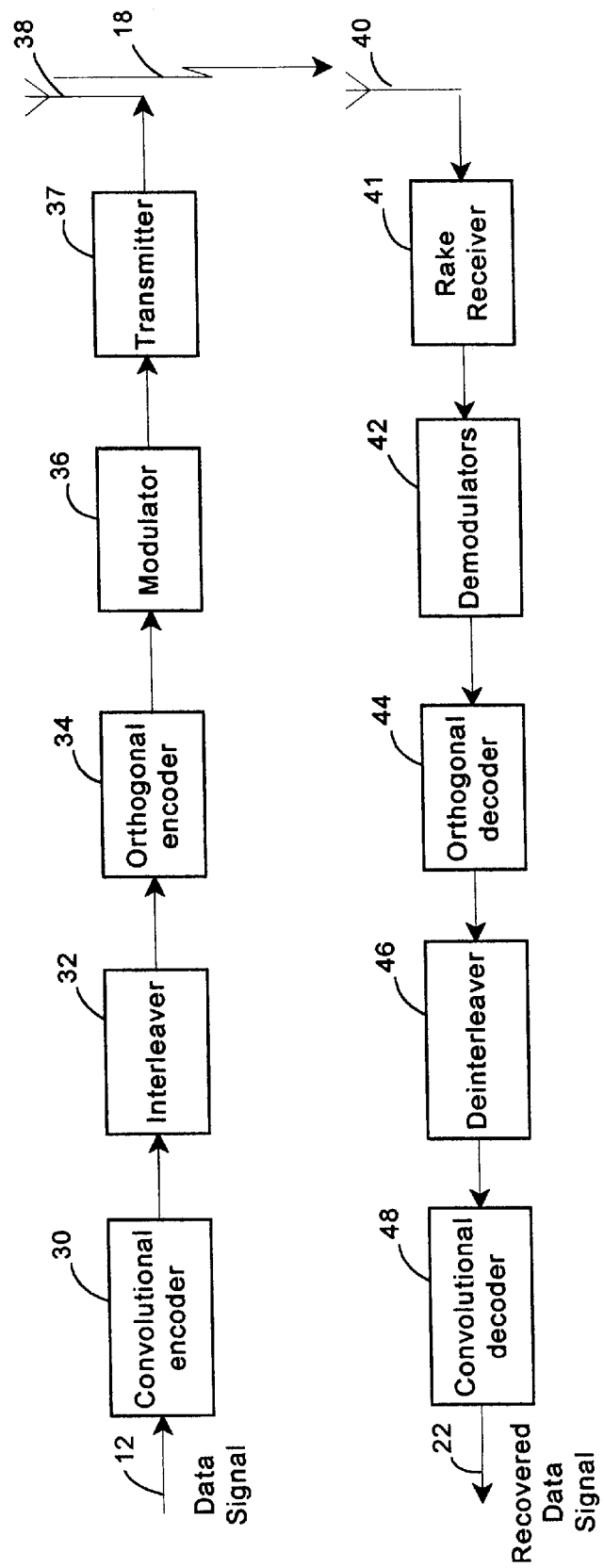
FIG. 2 is a more detailed diagram of the transmitter and receiver of FIG. 1.

FIG. 2 is a more detailed diagram of the transmitter 10 and receiver 20 of FIG. 1. The data signal 12 to be transmitted is wrapped around a forward error correction code by a conventional convolutional encoder 30, typically comprising shift registers and modulo-2 adders. As is well known in the art, the adders create check digits that are a function of a particular subset of the data signal to be transmitted as it is passed through the shift registers.

Since convolutional encoding only works on random (non-consecutive) errors, and since burst errors are common in wireless environments, the encoded signal is interleaved by an interleaver 32. The interleaver 32 shuffles the bits into a random sequence, thus making burst errors appear to be random errors after deinterleaving. The interleaved code is then divided into short bit sequences (e.g., six bits), each of which is mapped to an orthogonal code (e.g., 64 bit Walsh code) by an orthogonal encoder 34. The orthogonal codes are then sent to a modulator 36 and a transmitter 37 for communication from a transmitting antenna 38 to a receiving antenna 40. The receiving antenna 40 is coupled to a rake receiver 41 and a demodulator 42 to capture the radio signal 18. An orthogonal decoder 44 attempts to recover the radio signal 18. Once recovered, the data is put back in its original sequence by a deinterleaver 46 and the forward error correction code is removed by a convolutional decoder 48.

Figure 3:
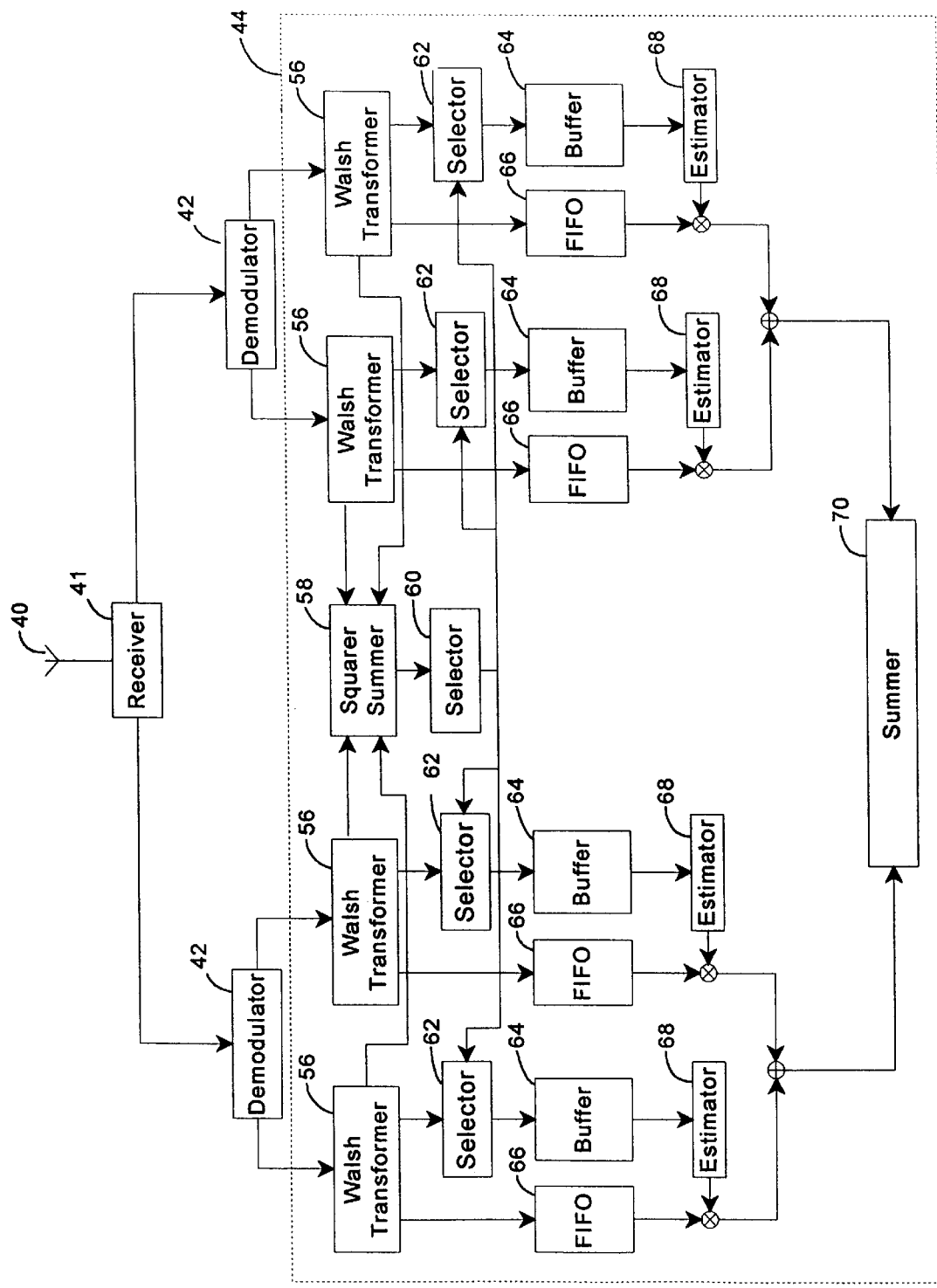
FIG. 3 is a more detailed diagram of the orthogonal decoder of FIG. 2.

An orthogonal decoder 44 constructed in accordance with the teachings of the present invention is illustrated in FIG. 3. The radio signal 18 is captured by the receiving antenna 40 and sampled (e.g., 1.2288 Msamples/second) by the rake receiver 41. The output of the rake receiver 41 is coupled to a plurality of demodulators 42. Each demodulator 42 demodulates a distinct signal contained within the sample data. Each of these distinct signals represents the same transmitted information with some phase variation induced by having traversed paths of different distance between the transmitter 10 and the receiver 20. One possible reason for the path difference is reflection off of buildings and the like.

In any event, in the preferred embodiment each demodulator 42 despreads the sampled in-phase and quadrature-phase signal independently by correlating the received sampled signals with the spreading codes. The despreaded signal is preferably resampled by each demodulator 42 at a predetermined rate (e.g., 307.2 ksamples/second) so that a sequence of four samples of the received spread spectrum signal is represented by a single data sample.

In order to provide initial estimations that received signals correspond to possible Walsh codes, means for developing likelihoods from each of the received signals is provided. In the preferred embodiment, the developing means is implemented by a processor programmed to perform a Fast Hadamard Transform on each symbol received from the demodulator. Accordingly, the in-phase and quadrature-phase signals are respectively provided to Walsh transformers 56. The Walsh transformers 56 process the in-phase and quadrature-phase signal independently. The Walsh transformers 56 correlate each of sixty-four Walsh codewords with the input signal at sixty-four sample length groups. There are many computationally efficient ways to implement the Walsh transformers 56, but in the preferred embodiment the Walsh transformers 56 are implemented by conventional processors programmed to perform the well-known Fast Hadamard Transform.

Preferably, these processors comprise digital signal processors which are commercially available from Texas Instruments. From each length sixty-four data group, the Walsh transformer generates sixty-four indexed data symbols. The index associates the output symbol with a Walsh codeword and the output symbol itself represents the measure of confidence of the associated Walsh codeword. The measure of confidence is the likelihood that the Walsh codeword (estimated signal) corresponds to the transmitted signal. In order to minimize the effect of noise, the outputs of the Walsh transformers 56 are then sequentially input to a squarer-summer 58. The squarer-summer 58 first squares each input signal and then sums up the squared input signals from the Walsh transformers 56 symbol-wise. In other words, the output of each Walsh transformer 56 corresponding to the first Walsh code are all squared and then added together. This process is performed for each of the sixty-four possible Walsh codes.

An index selector 60 then compares the sixty-four values developed by the squarer-summer 58 and selects the symbol with the largest value and outputs its index to a plurality of value selectors 62. Persons of ordinary skill in the art will appreciate that the squarer-summer 58 may be replaced with other functions such as exponential functions. Similarly, it will be appreciated that the output of the index selector 60 can be replaced by other noncoherent detection results. Further, although in the preferred embodiment, the squarer-summer 58 and the selector 60 are implemented by an application specific integrated circuit (ASIC), those of ordinary skill in the art will appreciate that other devices can be employed in this role.

Returning to FIG. 3, the outputs of the Walsh transformers 56 are also coupled to the value selectors 62. Value selectors 62 select the data symbol with the index specified by the index selector 60, and store the selected data symbols in a buffer 64. Each buffer 64 holds the last few data values from its respective value selector 62, preferably between 6 and 36 symbols. The size of the buffers 64 can be fixed or varied with time in a predetermined manner. FIFOs (first-in and first-out delay units) 66 queue all the data symbols from the respective Walsh transformers 56. As with the buffers, the size of the FIFOs 66 can be fixed or varied with time in a predetermined manner. Estimators 68 are used to develop a weight by averaging over the values in the buffers 64. The outputs from the FIFOs 66 are scaled (e.g., multiplied) by the averaged values from estimators 68 and then summed at the estimate summer 70. The output of the estimate summer 70 can be further processed or passed on to the deinterleaver 46.

In each data group, one and only one of the data outputs from each of the Walsh transforms 56 contains the designated information. Ideally, the value selectors 62 select data symbols containing the designated information. The decision from the index selector 60 produces the results of noncoherent detection and is used to predict the data symbols containing the designated information. Besides the index of the noncoherently decoded codeword for each data group, the index selector 60 may provide the difference of the largest data symbol and the second largest data symbol as a measure of reliability of the noncoherent decision to the value selector 62. In such an instance, the buffers 64 preferably buffer both the selected data symbols and the associated measure of reliability. The estimators 68 can use this reliability information to further improve the signal-to-noise improvements of the present invention. For example, the estimators 68 could average only over the data symbols whose measure of reliability exceeds a predetermined threshold, or could average only over the most reliable portion of the buffered data symbols at a predetermined percentage.

It should be noted that the FIFOs are not required, the size of the FIFOs can be reduced to zero and the disclosed method and apparatus will still offer significant improvements over the prior art. However, the FIFOs can improve the performance further especially for high vehicle speed. Furthermore, any delay associated with the FIFOs, may not necessarily increase the delay of the overall receiver 20. The deinterleaver can start to deinterleave the received data symbols only after one complete frame is received. Thus, the delay introduced at the beginning of a frame will not increase the overall delay. Therefore, in order to reduce delay, it is possible to shrink the size of the FIFOs towards the end of a frame. They could be reduced to the size of permissible delay or even to zero at the end of the frame. For power controlled system, the estimators first scale (amplify or dampen) the buffered data symbols by the relative difference in transmitted power.

Figure 4:
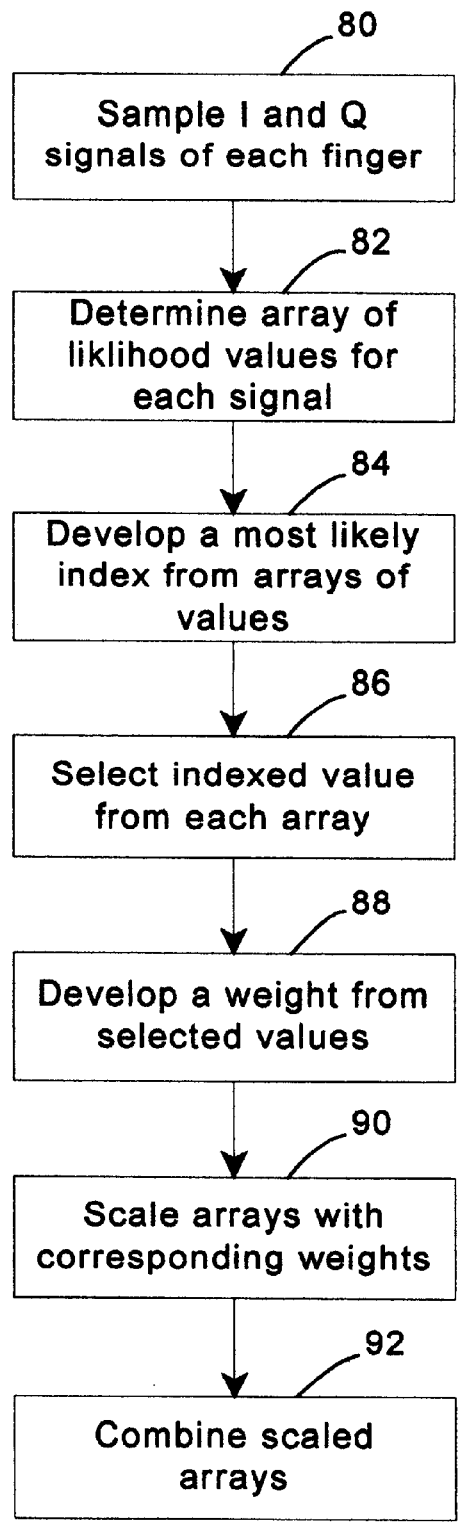
FIG. 4 is a more detailed flowchart of the orthogonal decoder of FIG. 2.

In an alternative embodiment, the orthogonal decoder 44 is realized in a microprocessor, employing a software program in accordance with the teachings of the present invention. A flowchart representing the program is illustrated in FIG. 4.

At a block 80 each path (different fingers of the rake receiver 41) and the in-phase and quadrature-phase of the radio signal 18 is sampled. In order to provide initial estimations that the sampled signals correspond to possible Walsh codes, the program performs a Fast Hadamard Transform at a block 82 to create an array of likelihood values for each signal. Each indexed position in the likelihood array corresponds to one of the sixty-four possible Walsh codes (e.g., indexed position zero corresponds to a Walsh code of sixty-four zeros, indexed position one corresponds to a Walsh code of thirty-two zeros, followed by thirty-two ones, indexed position two corresponds to a Walsh code of sixteen zeros, followed by thirty-two ones, followed by sixteen zeros). Each value in the array represents a likelihood that the corresponding Walsh code is the one the transmitter intended (e.g., indexed position zero, corresponding to a Walsh code of sixty-four zeros, has a likelihood of being the intended code of 35%, and so on for each position in each array).

If only one receive path were present in the system, selecting the most likely intended Walsh code (or the index corresponding to the most likely intended Walsh code) could be as simple as scanning the array for a largest value. However, in the preferred embodiment multiple receive signals are available from the in-phase and quadrature-phase portions of each finger of the rake receiver 41. Since each signal represents the same Walsh code, the likelihood arrays are combined at a block 84 by adding all the likelihood values in indexed position zero together, then all the likelihood values in indexed position one are added together, and so on, until all sixty-four likelihood values have been combined. In other words, each receive signal gets a vote as to the likelihood that each of the sixty-four possible Walsh codes is being received. Once the votes are combined, the largest sum is identified at the block 84 as the most likely index.

Once the most likely index is developed, the original likelihood value corresponding to the most likely index, is selected from each of the original (prior to combining) likelihood arrays at a block 86. In other words, regardless of what a particular received signal may have 'voted', the index developed from the 'collective vote' is used for selection in each likelihood array. The selected likelihood values are used to develop a weight for each receive path and phase, by accumulating a plurality of the selected values over a predefined time period and calculating an average of the plurality at a block 88.

By scaling all of the likelihood values in each array by its corresponding weight, the affects of phase shifts incurred in transmission are removed. Accordingly, at a block 90 each of the values, in each of the likelihood arrays, is multiplied by the weight developed for that particular array (i.e. the one that goes with that receive path or phase). Now that each array of likelihood values has the affects of phase shifts removed, a second collective vote can be taken. Accordingly, at a block 92 the scaled arrays are combined, as before, by summing parallel positions.

Persons of ordinary skill in the art will appreciate that the microprocessor and software may be replaced with other circuits such as an applications specific integrated circuit (ASIC) or a programmable logic device (PLD). Similarly, it will be appreciated that the Fast Hadamard Transform can be replaced by other transformation methods. Further, although in the preferred embodiment, the weight is developed by accumulating a plurality of the selected values over a predefined time period and calculating an average of the plurality, those of ordinary skill in the art will appreciate that subsets of the plurality and operations other than averaging can be employed in this role.

In summary, persons of ordinary skill in the art will readily appreciate that an improved method and apparatus for estimating the phase of noncoherently detected signals has been provided. Systems and apparatuses implementing the teachings of the invention can enjoy signal-to-noise ratios which improve over prior art approaches by 2 dB or more, depending on vehicle speed, and channel conditions. This results in a capacity gain in the range of 60%–100%. It also has significant impact on the covering range and/or the life span of the battery of a mobile unit.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for estimating the phase of a noncoherently detected orthogonal signal comprising the steps of:

sampling first and second received signals, each of the first and second received signals being representative of a transmitted signal;

determining a first value from the first received signal indicative of a likelihood that a first estimated signal corresponds to the transmitted signal;

determining a second value from the first received signal indicative of a likelihood that a second estimated signal corresponds to the transmitted signal;

determining a third value from the second received signal indicative of a likelihood that the first estimated signal corresponds to the transmitted signal;

determining a fourth value from the second received signal indicative of a likelihood that the second estimated signal corresponds to the transmitted signal;

developing an index from the first, second, third and fourth values;

selecting a first selected value from the first and second values based on the index;

developing a first weight from the first selected value;

selecting a second selected value from the third and fourth values based on the index;

developing a second weight from the second selected value;

scaling the first and second values with the first weight; and, scaling the third and fourth values with the second weight.

2. A method as defined in claim 1, wherein the first received signal is an in-phase signal from a first finger of a rake receiver.

3. A method as defined in claim 2, wherein the second received signal is a quadrature-phase signal.

4. A method as defined in claim 2, wherein the second received signal is from a second finger of a rake receiver.

5. A method as defined in claim 1, wherein the step of determining a first value is performed via a Hadamard Transform.

6. A method as defined in claim 1, wherein the step of developing an index comprises summing the first and third values and summing the second and fourth values and selecting the index of the larger of the two sums.

7. A method as defined in claim 1, wherein the step of developing the weight comprises the step of accumulating a plurality of the selected values over a predefined time period and calculating an average of the plurality.

8. A method as defined in claim 7, wherein the average is calculated based on a subset of the plurality.

9. A method as defined in claim 1, wherein the step of developing the weight is based on a subset of the plurality that exceeds a predetermined threshold.

10. A method as defined in claim 1, wherein the step of developing the weight is based on a subset of the plurality exceeding a predetermined percentage.

11. A method as defined in claim 1, wherein the step of scaling the first and second values comprises multiplying the first and second values by the first weight.

12. A method as defined in claim 1, wherein the step of scaling the first and second values further comprises scaling by a relative difference in transmitted power.

13. A method as defined in claim 1, further comprising the step of combining the scaled first value with the scaled third value and combining the scaled second value with the scaled fourth value.

14. In a rake receiver, an apparatus for compensating for phase differences between first and second received signals corresponding to a transmitted signal, comprising:

a first selector for selecting a first value from first and second likelihoods that first and second estimates correspond to the transmitted signal, the first and second likelihoods being based on the first received signal;

a first estimator for developing a first weight from the first value;

a second selector for selecting a second value from third and fourth likelihoods that third and fourth estimates correspond to the transmitted signal, the third and fourth likelihoods being based on the second received signal;

a second estimator for developing a second weight from the second value; and an index generating device for generating an index based on the first, second, third and fourth likelihoods, wherein the first and second selectors select the first and second values based on the index, said first weight and said second weight being used to scale said likelihoods to compensate for said phase differences.

15. An apparatus as defined in claim 14, further comprising a first buffer for buffering the first value.

16. An apparatus as defined in claim 15, further comprising a second buffer for buffering the second value.

17. An apparatus as defined in claim 14, wherein the first received signal is an in-phase signal from a first finger of a rake receiver.

18. An apparatus as defined in claim 17, wherein the second received signal is a quadrature-phase signal.

19. An apparatus as defined in claim 17, wherein the second received signal is from a second finger of a rake receiver.

20. An apparatus as defined in claim 14, further comprising means for developing likelihoods from a received signal.

21. An apparatus as defined in claim 20, wherein the developing means develops likelihoods in accordance with a Hadamard Transformer.

22. An apparatus as defined in claim 20, wherein the developing means comprises a programmed processor.

23. An apparatus as defined in claim 20, wherein the developing means comprises an integrated circuit.

24. An apparatus as defined in claim 14, wherein the first and second estimators scale by a relative difference in transmitted power.

25. In a rake receiver, an apparatus comprising:

a first selector for selecting a first value from first and second likelihoods that first and second estimates correspond to the transmitted signal, the first and second likelihoods being based on the first received signal;

a first estimator for developing a first weight from the first value; a second selector for selecting a second value from third and fourth likelihoods that third and fourth estimates correspond to the transmitted signal, the third and fourth likelihoods being based on the second received signal;

a second estimator for developing a second weight from the second value;

a first buffer for buffering the first value; and a first queue for queuing the first and second likelihoods.

26. An apparatus as defined in claim 25, wherein the first queue shrinks in size.

27. In a rake receiver, an apparatus comprising:

a first selector for selecting a first value from first and second likelihoods that first and second estimates correspond to the transmitted signal, the first and second likelihoods being based on the first received signal;

a first estimator for developing a first weight from the first value;

a second selector for selecting a second value from third and fourth likelihoods that third and fourth estimates correspond to the transmitted signal, the third and fourth likelihoods being based on the second received signal;

a second estimator for developing a second weight from the second value;

a first buffer for buffering the first value;

a second buffer for buffering the second value; and a queue for queuing the third an fourth likelihoods.

28. An apparatus as defined in claim 27, wherein the queue shrinks in size.

* * * * *